United States Patent [19]

Kawachi et al.

[11] 4,345,928
[45] Aug. 24, 1982

[54] FABRICATION METHOD OF SINGLE-MODE OPTICAL FIBER PREFORMS

[75] Inventors: Masao Kawachi; Satoru Tomaru; Takao Edahiro; Shoichi Suto, all of Mito, Japan

[73] Assignee: Nippon Telegraph & Telephone Public Corporation, Tokyo, Japan

[21] Appl. No.: 188,914

[22] Filed: Sep. 19, 1980

[30] Foreign Application Priority Data

Oct. 9, 1979 [JP] Japan .................................. 54-129530
Jul. 11, 1980 [JP] Japan .................................. 55-93841

[51] Int. Cl.³ .............................................. C03B 19/06
[52] U.S. Cl. ........................................ 65/18.2; 65/3.12
[58] Field of Search ........................... 65/3.12, 18.2, 32

[56] References Cited

U.S. PATENT DOCUMENTS

| | | | |
|---|---|---|---|
| 4,062,665 | 12/1977 | Izawa et al. | 65/3.12 |
| 4,135,901 | 1/1979 | Fujiwara et al. | 65/3.12 X |
| 4,259,101 | 3/1981 | Tsukuda et al. | 65/3.12 X |

FOREIGN PATENT DOCUMENTS

| | | | |
|---|---|---|---|
| 2625064 | 3/1977 | Fed. Rep. of Germany | 65/3.12 |
| 2906523 | 9/1979 | Fed. Rep. of Germany | 65/3.12 |

OTHER PUBLICATIONS

Sudo et al., "Low-OH-Content Optical Fiber . . . "; Electronic Letters; Aug. 17, 1978, vol. 14, No. 17, pp. 534-534.

Izawa et al., "Continuous Fabrication Process for High-Silica Fiber Preforms", The Transactions of the IECE of Japan, Nov. 1979, vol. E62, No. 11, pp. 779-785.

*Primary Examiner*—Richard V. Fisher
*Attorney, Agent, or Firm*—Spencer & Kaye

[57] ABSTRACT

A method of fabricating a single-mode optical fiber preform wherein a core torch produces fine glass particles eccentrically with respect to the center area of a flame stream, the core torch being so arranged as to blow the flame stream at an angle inclined to a seed rod. The porous glass body forming the core is grown on one end of the rod and in the direction of the axis of the rod. A cladding layer is formed on the periphery of the porous glass core body by at least one torch for forming the cladding. The obtained porous glass body is heated and vitrified into a transparent glass body, which is sealed in a silica tube for jacketting to form a single-mode optical fiber preform. At least one exhaust port is disposed within a distance of 1 mm to 50 mm from the periphery of the porous glass body and in the vicinity of the growing surface of the glass body to exhaust residual glass fine particles and undesired gases. A porous glass body having a diameter of 20 mm or less is easily formed. Single-mode optical fiber having a cladding-to-core-diameter ratio of 3 or more is fabricated by the VAD method. Accordingly, a long-length and low-loss single-mode optical fiber is mass-produced.

7 Claims, 18 Drawing Figures

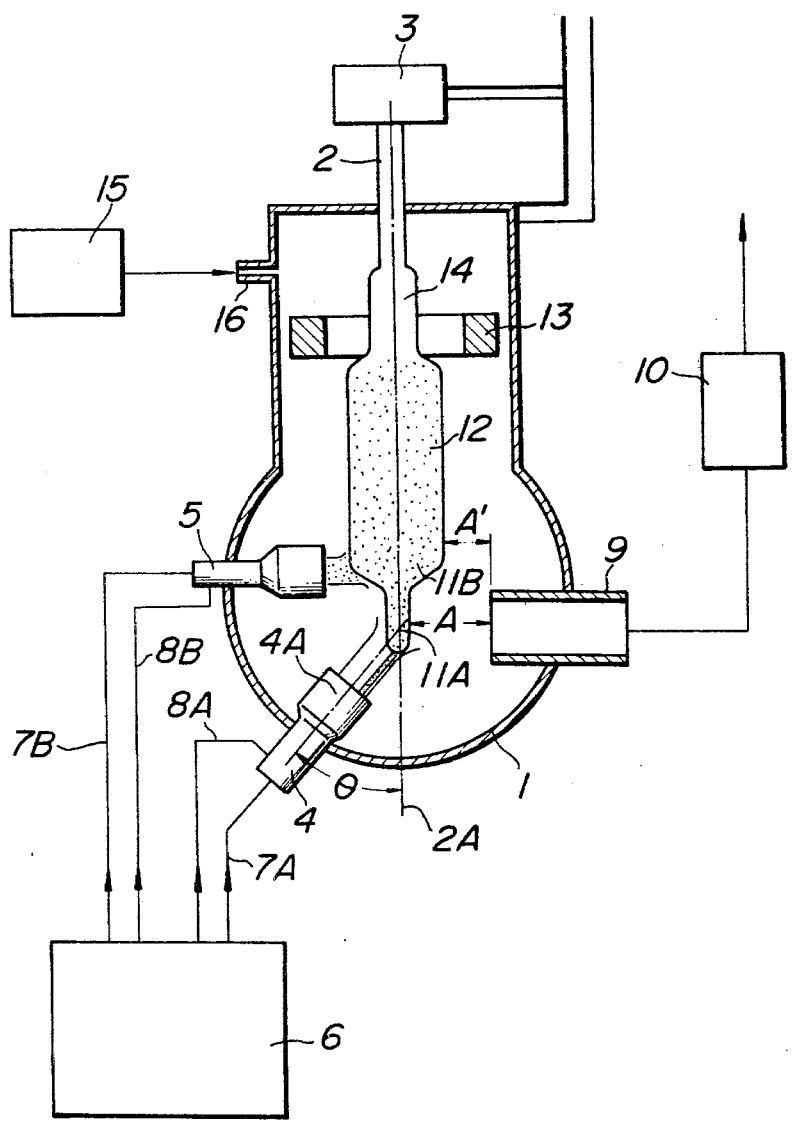

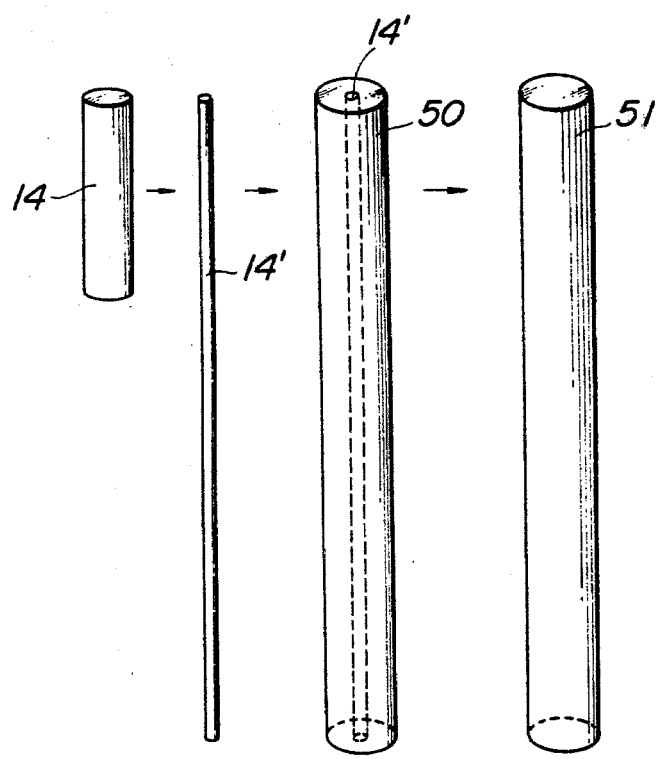

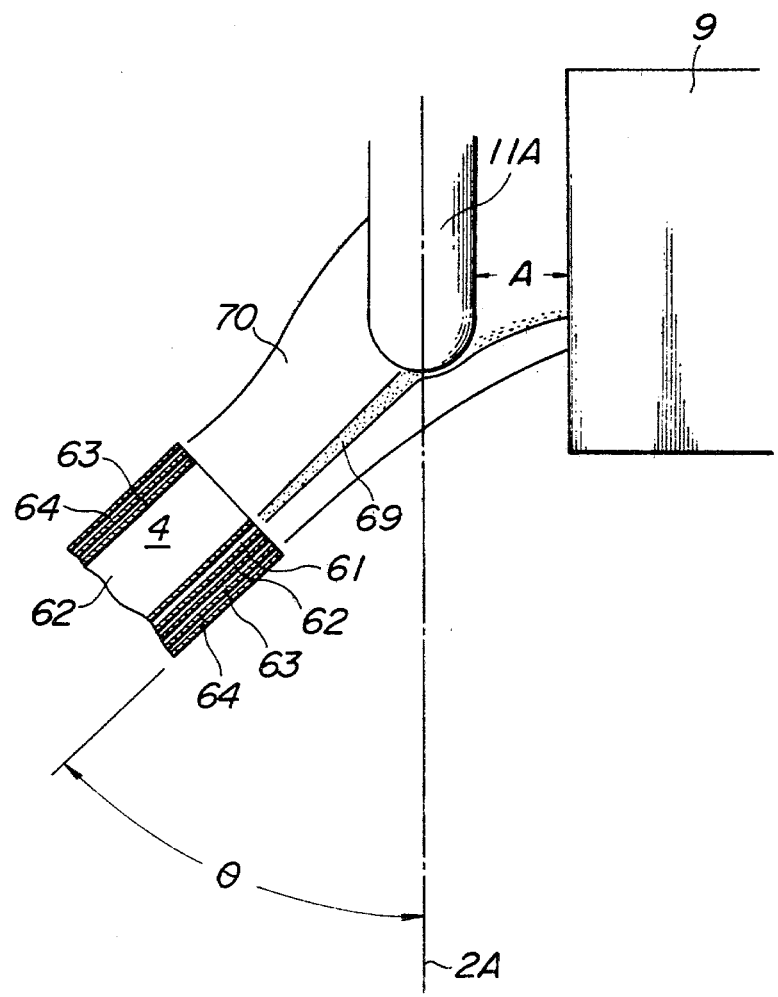

|—10mm—|

FABRICATION METHOD OF SINGLE-MODE OPTICAL FIBER PREFORMS

BACKGROUND OF THE INVENTION

The present invention relates to a method of fabricating single-mode optical fiber preforms and a torch for fabricating porous preforms for the core of the single-mode optical fiber preform.

A single-mode optical fiber has an extremely wide transmission bandwidth, and accordingly the single-mode optical fiber is expected to be employed as a high-capacity long distance transmission line in the future. There is known a so-called MCVD (Modified Chemical Vapor-phase Deposition) method which has been used as a method for fabricating a single mode optical fiber preform. In this method, a cladding glass layer and a core glass layer are formed on the inner surface of a supporting silica tube after which the assembly of these layers is collapsed to form an optical fiber preform. The resultant single-mode optical fiber has a small transmission loss. In this respect, the MCVD method is available for the manufacturing of, for example, a single-mode optical fiber with a transmission loss in the order of 1 dB/km or less in the wavelength band of 1.55 $\mu$m, which has recently attracted attention. In the MCVD method, however, the length of a single-mode optical fiber obtained from a single optical fiber preform is generally 2 to 5 km and even at most 10 km. Therefore, the MCVD method is disadvantageous for the mass-production of single-mode optical fibers.

Another known method of manufacturing a single-mode optical fiber is the so-called rod-in-tube method. Briefly, in this method, a single-mode optical fiber preform is fabricated first by synthesizing a glass rod to be a core by the so-called plasma method and then by sealing it in a silica tube having proper dimensions. While the rod-in-tube method, when comparing with the MCVD method, is suitable for mass-production of optical fibers, the rod-in-tube method has a disadvantage of the large transmission loss. The large transmission loss in the rod-in-tube method is caused largely by the waveguiding properties of the single-mode optical fiber. In the case of the single-mode optical fiber, a relatively large part of the optical power propagates through not only the core region but also the cladding region. Accordingly, the optical power, through the propagation, is influenced by imperfections and impurities at the boundaries between the glass rod forming the core region and the silica tube forming the cladding region as well as impurities contained in the silica tube, such as OH ions and small bubbles. Because of this influence, it is difficult to reduce the optical transmission loss to a value less than 5 dB/km.

On the other hand, the VAD (vapor-phase axial-deposition) method in which a cylindrical porous preform is first prepared and then is subjected to heating at a high temperature and a vitrifying process to form a transparent preform is suitable for the mass-production of optical fibers. In the VAD method, glass raw material gas such as $SiCl_4$, $GeCl_4$, $POCl_3$, $BBr_3$ or the like and flame forming gas such as $O_2$, $H_2$, Ar, He or the like are led to a glass synthesizing torch. Glass fine particles such as $SiO_2$, $GeO_2$, $P_2O_5$, $B_2O_3$ or the like synthesized by the flame hydrolysis or oxidation reaction of those materials with the glass synthesizing torch are attached and deposited onto a seed rod so as to form a cylindrical porous preform. The cylindrical porous preform thus formed is heated at 1500° to 1700° C. by a high temperature heater and is vitrified into a transparent optical fiber preform.

The glass synthesizing torch is generally formed as a multi-layer tube having such an arrangement that a raw material gas blowing nozzle with a centered circular cross section is coaxially surrounded by an inactive gas blowing nozzle for Ar, He or the like, a combustible gas blowing nozzle for $H_2$ or the like, and an auxiliary gas blowing nozzle for $O_2$ or the like, which are disposed in this order. Glass particles, produced by flames blown together with glass raw material gas are sintered and deposited on the seed rod, so that the rod-like glass sintered member is grown in the axial direction. Usually, the synthesizing torch and a flame stream blown out from the torch are disposed coaxially or in parallel with a rotation axis of the seed rod and the porous preform. In forming the porous preform for the optical fiber by the synthesizing torch, the produced glass particles are diffused in a direction orthogonal to the rotation axis, or in the horizontal direction. Therefore, it is difficult to reduce the diameter of the porous glass body thus formed to less than about 40 mm, even if an area of the raw material gas blowing nozzle at the center of the torch is selected as small as possible or the flame stream is converged as intensively as possible.

As an improvement of the VAD method, the synthesizing torch and the flame stream may be inclined by a given angle with respect to the seed rod and the rotation axis of the porous preform. This improved VAD method could stably fabricate the porous preform to a size as small as about 30 mm in diameter. It was, however, difficult to reduce the diameter of the porous preform to less than 30 mm. If the porous preform having a diameter of 30 mm is used as the porous glass body for the core and a cladding layer is deposited on the rod-like porous glass body by using the subsidiary torch, the cladding-to-core diameter ratio is approximately 2 at maximum.

As will be described in detail later, it is required that the cladding-to-core diameter ratio be approximately 3 or more in order to form a single-mode optical fiber. In the above-mentioned example, the ratio is about 2 and the thickness of the cladding layer is insufficient for a ratio of 3 or more. The ratio may be increased by increasing the thickness of the cladding layer. If the thickness is increased in this way so as to obtain a ratio of 3 or more, the diameter of the porous preform for the cladding exceeds 100 mm. The result is that a stress developed therein may crack the porous preform and the excessive diameter renders it inconvenient to handle the porous preform when it is consolidated or vitrified. Because of those disadvantages, it has not been possible to manufacture single-mode optical fibers by taking full advantage of the suitability of the VAD method for the mass-production of optical fibers.

SUMMARY OF THE INVENTION

In view of the above, it is an object of the invention to provide a method of fabricating a single-mode optical fiber preform which may be used to manufacture on a mass-production basis with the VAD method a single-mode optical fiber preform having a long-length and low-loss.

Another object of the present invention is to provide a core torch suitable for fabricating a porous glass body for the core of a single-mode optical fiber having a small diameter.

In order to achieve the above objects, in the present invention, a porous glass body is attached to and axially deposited on one end of a seed rod and grown by a core torch which produces fine glass particles for the core eccentrically with respect to the center area of the flame stream. The porous glass body is attached to and deposited on the periphery of the porous glass body for the core by at least one cladding torch for producing fine glass particles which form a cladding layer. The obtained porous glass body is heated and vitrified into a transparent glass body. The transparent glass body is sealed in a silica tube, thereby forming a single-mode optical fiber preform.

In another aspect of fabricating a single-mode optical fiber preform according to the present invention, a core torch which produces fine glass particles eccentrically with respect to the center area of a flame stream is so arranged as to blow the flame stream in a direction inclined to a seed rod. The porous glass body for the core is grown on one end of the seed rod and in the direction of the axis of the seed rod. A cladding layer is formed on the periphery of the porous glass body for the core by at least one torch for producing the cladding. The obtained porous glass body is heated and vitrified into a transparent glass body. The transparent glass body is sealed in a silica tube for jacketting to form a single-mode optical fiber preform. In a preferred embodiment of the present invention, the core torch is inclined by 30° to 50° with respect to the axis of the seed rod.

It is preferable that the core torch have a glass raw material gas blowing nozzle and a combustible gas blowing nozzle. The combustible gas blowing nozzle surrounds the glass raw material gas blowing nozzle in such a way that the glass raw material blown out from the glass raw material gas blowing nozzle is deviated from the center of an inner area defined by the combustible gas blowing nozzle, with respect to an oxy-hydrogen flame stream blown out from the combustible gas blowing nozzle.

It is also preferable that at least one exhaust port be disposed within a distance of 1 mm to 50 mm from the periphery of the porous preforms for the core and cladding and in the vicinity of the growing surface of the porous preforms for the core and cladding. The glass particles not attached to and deposited on the growing surface of the porous preforms for the core and cladding, the gases produced as a result of hydrolysis by the flame or the thermal oxidation in the torch for the core and cladding, and residual non-reacted glass raw material and flame forming gases are exhausted through the exhaust port. Especially, it is preferable that the above-mentioned inclination angle be 30° to 40° and the above-mentioned distance is 5 mm to 10 mm.

According to the present invention, the core torch has a glass raw material gas blowing nozzle and a combustible gas blowing nozzle, which surrounds the glass raw material gas blowing nozzle in such a way that the glass raw material gas blown out from the glass raw material gas blowing nozzle is deviated from the center of an inner area defined by the combustible gas blowing nozzle, with respect to an oxy-hydrogen flame stream blown out from the combustible gas blowing nozzle.

Here, it is also preferable that an inert gas blowing nozzle, the combustible gas blowing nozzle and an auxiliary gas blowing nozzle be disposed in this order, surrounding the glass raw material gas blowing nozzle, and the glass raw material gas blowing nozzle be so arranged as to be deviated from the center of the inner area defined by the inert gas blowing nozzle.

Alternatively, a diameter controlling gas blowing nozzle for blowing out a diameter controlling gas may be disposed adjacent to the glass raw material gas blowing nozzle in the inner area defined by the inert gas blowing nozzle so as to control the diameter of the porous preform for the core, and a subsidiary combustible gas blowing nozzle may be formed adjacent to the diameter controlling gas blowing nozzle.

Additionally, the inert gas blowing nozzle, the combustible gas blowing nozzle and the auxiliary gas blowing nozzle, surrounding the glass raw material gas blowing nozzle, may be disposed in this order, and a controlling gas blowing nozzle may be disposed in the inner area defined by the inert gas blowing nozzle and adjacent to both sides of the glass raw material nozzle, in a manner such that the raw material gas blown out from the glass raw material gas blowing nozzle is deviated relative to the oxy-hydrogen flame stream, by the controlling gas blown out from the controlling gas blowing nozzle.

BRIEF DESCRIPTION OF THE DRAWINGS

FIG. 2A is a schematic diagram showing an embodiment of an apparatus for fabricating glass preforms by the VAD method according to the present invention;

FIG. 3 is a schematic diagram for illustrating the steps of sealing a glass preform in a glass tube in the present invention;

FIG. 5 is a schematic diagram for explaining the formation of a porous glass body for a core by a core torch in the present invention;

DETAILED DESCRIPTION OF PREFERRED EMBODIMENTS

Figure 1:
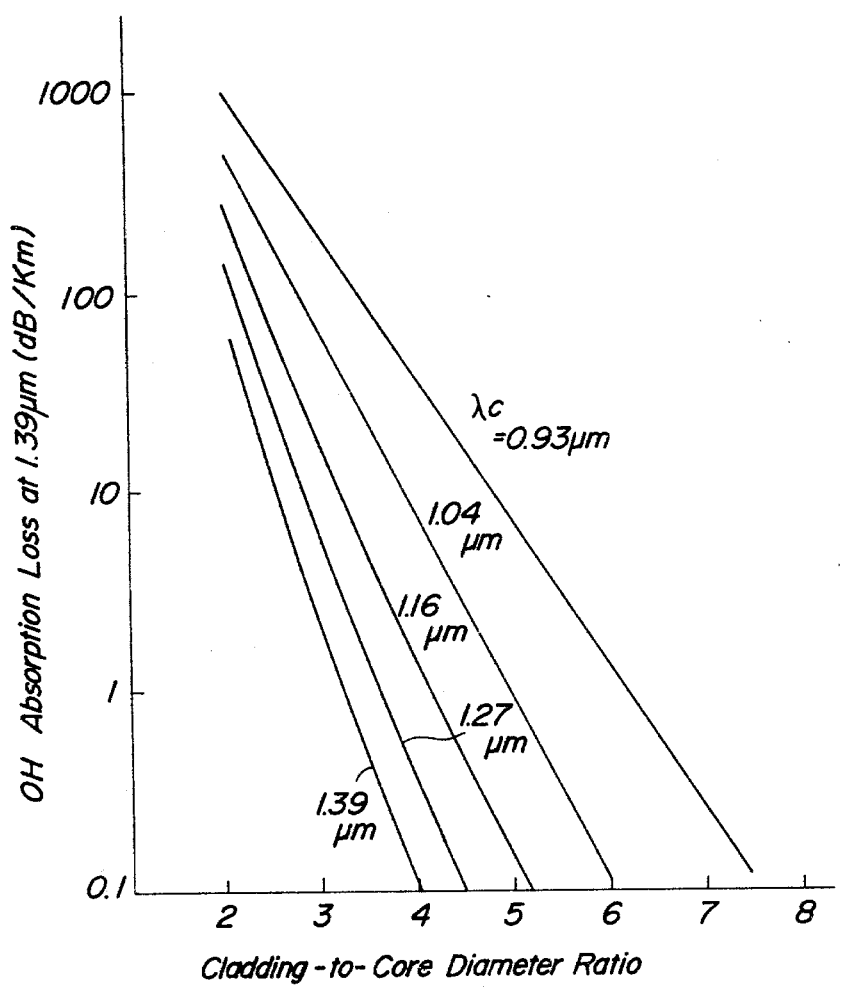
FIG. 1 is a graph for illustrating the theoretical relationship between the influence of the absorption loss by OH ions contained in the silica glass tube and a cladding-to-core diameter ratio.

The method of fabricating a transparent preform for a single-mode optical fiber according to this invention will be described in detail.

In order to obtain a single-mode optical fiber having a low-loss, it is necessary to make the core diameter as small as possible and to select a cladding-to-core diameter ratio of 3 or more. The reason for this will be given.

Generally, in manufacturing a single-mode optical fiber, the transparent preforms for the core and cladding are stretched in conformity with the inner diameter of a silica glass tube. Then, the stretched transparent preforms are inserted into a silica glass tube and sealed therein (a jacketting process). The single-mode optical fiber preform thus obtained is drawn by a fiber drawing machine into a single-mode optical fiber. The core diameter 2a of an optical fiber when the single-mode optical fiber preform is drawn into an optical fiber having an outer diameter d is given by the following equation;

$$2a = 2A \cdot d / \sqrt{D1^2 - D2^2 + (2B)^2} \quad (1)$$

where 2A is the core diameter of the stretched transparent glass preform, 2B is the cladding diameter, D1 is the outer diameter of the silica glass tube, and D2 is the inner diameter of the silica glass tube.

The single-mode condition for this optical fiber is expressed by the following equation;

$$V = 2\pi a \sqrt{n1^2 - n2^2} / \lambda < 2.405 \quad (2)$$

where V is the normalized frequency, $\lambda$ is the light source wavelength, n1 and n2 are refractive indices of the core and cladding regions. Practically, $n1 \simeq n2 \simeq 1.458$. This equation (2) is transformed into $$V = 2\pi a \sqrt{2n_2 \Delta n} / \lambda < 2.405 \quad (3)$$

where $\Delta n = n1 - n2$.

As described above in connection with the disadvantage of the rod-in-tube method, in order to obtain a single-mode optical fiber having a low-loss, a sufficiently thick cladding layer must be formed, that is, a cladding-to-core diameter ratio 2B/2A of the preform must be sufficiently large, when the preform is fabricated, since the optical power extends into the cladding region around the core region.

FIG. 1 graphically represents theoretical values of the OH absorption loss as a function of the cladding-to-core diameter ratio with a parameter of the cutoff wavelength $\lambda c$ when the OH content ($\simeq 200$ ppm) in the silica glass tube 21 is 1.39 $\mu$m. In order to obtain a single-mode optical fiber having a low-loss at 1.3 $\mu$m or 1.55 $\mu$m wavelength, or in the so-called long wavelength region, the OH ion absorption loss must be 20 dB/km or less. Generally, the cutoff wavelength is selected at about 1.0 to 1.2 $\mu$m. Accordingly, it is seen from FIG. 1 that the cladding-to-core diameter ratio must be about 3 or more. If the diameter ratio is about 3 or more, the boundary between the transparent preform and the silica glass tube is also prevented from being contaminated.

According to the conventional VAD method, optical fibers can be mass-produced. However, with the conventional VAD method it is extremely difficult to fabricate a porous glass preform having a cladding-to-core diameter ratio of about 3 or more. For this reason, it is impossible to fabricate a single-mode optical fiber by the conventional VAD method. More specifically, in the conventional VAD method, it is difficult to reduce the diameter of the porous glass body for the core to 30 mm or less, mainly due to the core torch which is used. Accordingly, in order to obtain a cladding-to-core ratio of about 3 or more, the diameter (outer diameter of the cladding) of the porous preform should exceed 100 mm, so that the stress developed in the porous preform may crack the porous preform and the "cracking", when formed, makes it almost impossible to consolidate the preform. Coping with this problem, the present inventors carefully studied the structure of a core torch and the conditions for the preform fabrication. Through the study, it was found that the use of a core torch having a glass raw material gas blowing nozzle deviated from the center area of the combustible gas blowing nozzle makes it easy to form a porous glass body for the core having a diameter of 20 mm$\phi$ or less, and provides a cladding-to-core diameter ratio of 3 or more. The present invention was completed under the recognition of these technical facts.

A method of fabricating a single-mode optical fiber according to the present invention will be described with reference to FIGS. 2A and 3. FIG. 2A shows an apparatus for fabricating a transparent preform according to the present invention. FIG. 3 shows a series of steps of the process for jacketting the transparent glass. In FIG. 2A, reference numeral 1 designates a reaction vessel, 2 a supporting rod used as a seed rod on which a porous glass body is attached and deposited, 3 a pulling-up machine for pulling up or translating the supporting rod 2 while rotating the rod 2, 4 a core torch and 5 a cladding torch. The core torch 4 is mounted to the vessel 1 with an acute inclination angle $\theta \simeq 30°$ to $50°$ with respect to the axis 2A of the supporting rod 2. It is preferable that the inclination angle be adjustable. Details of the core torch 4 will be described later. A supplier 6 supplies to the torches 4 and 5 the glass raw material such as $SiCl_4$, $GeCl_4$, $POCl_3$ and $BBr_3$, an atmospheric gas such as Ar, He or $N_2$, a combustible gas such as $H_2$ and a subsidiary gas such as $O_2$, the latter two generally being referred to as flame forming gases. The glass raw material gas is supplied from the supplier 6 to the torches 4 and 5 through glass raw material gas pipes 7A and 7B. Various flame forming gases are supplied through flame forming gas pipes 8A and 8B to the torches 4 and 5. Reference numeral 9 designates an exhaust port attached to the reaction vessel 1. Through the exhaust port 9, gases such as $H_2O$, HCl, $Cl_2$ and so on produced by hydrolysis or the thermal oxidation reaction of the flames blown out from the torches 4 and 5, the non-reacted glass raw material gas such as $SiCl_4$, $GeCl_4$, $POCl_3$, $BBr_3$ or the like and the gas such as Ar, He, $N_2$ are exhausted to the exhaust gas cleaner 10 for processing of these gases.

Further, in FIG. 2A, 11A designates a formed porous glass body for the core, 11B a porous glass body for the cladding (a cladding layer) deposited around the porous glass body for the core 11A, 12 a porous preform composed of the core and cladding regions, 13 a ring heater for heating the porous preform 12, which passes through the ring heater 13, at 1500° C. to 1700° C. to vitrify and consolidate the preform 12 into a transparent preform 14, 15 a supplier for supplying halogen gas for dehydration treatment such as a mixture of He and $Cl_2$ gases, 16 a supply port for supplying the dehydration treatment gas into the reaction vessel 1.

In operation of the apparatus shown in FIG. 2A, the glass raw material gas containing, for example, $SiCl_4$ as the major component and the flame forming gases are supplied to the core torch 4 from the supplier 6 through the pipes 7A and 8A so as to attach glass fine particles containing $SiO_2$ as the major component and $GeO_2$ and $P_2O_5$ as a dopant onto an end face of the supporting rod 2. Then, the supporting rod 2 is pulled up while being rotated by the pulling-up machine 3, so that the porous preform for the core 11A is grown. At the same time, the cladding torch 5 blows out glass fine particles containing only $SiO_2$ or containing $SiO_2$ as the major component and $P_2O_5$ or $B_2O_3$ around the porous preform 11A, in a manner such that these particles are deposited onto the periphery of the glass body 11A. As a result, a porous glass cladding layer 11B is formed on the surface of the glass body 11A. The porous preform 12 composed of the core region and the cladding region thus formed is heated, for example, at 1500° C. by the vitrifying heater 13, so that a transparent preform 14 having a core glass covered with a cladding glass is formed. In the vitrifying step, the dehydration treatment gas such as a mixture of He and $Cl_2$ gases is supplied from the supply port 16 into the reaction vessel 1 to remove the OH content from the porous preform 14.

Figure 2B:
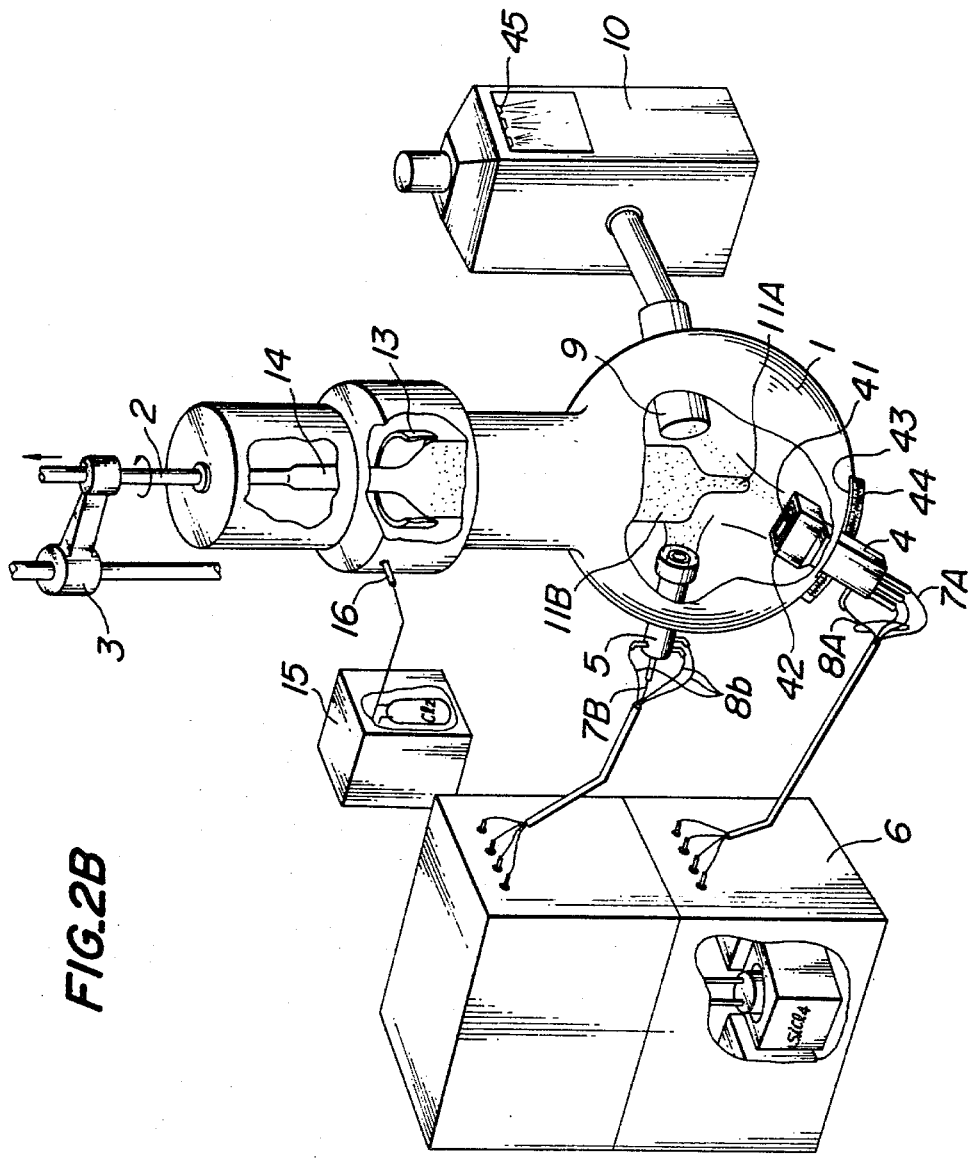
FIG. 2B is a perspective view, partially broken, showing an embodiment of a glass preform fabricating apparatus according to the present invention shown in FIG. 2A.

Turning now to FIG. 2B, there is shown a detailed embodiment of an apparatus for fabricating a single-mode optical fiber preform according to the invention. Like numerals are used to designate corresponding portions in FIG. 2B. In FIG. 2A, the supplier 6 for supplying the glass raw material, which is of the conventional type, measures the various gases each by a given amount and supplies the measured gases to the core torch 4 and the cladding torch 5. As will be described, the core torch 4 is so arranged that its glass raw material blowing nozzle 41 is deviated from the center area of the blowing nozzle 42 for the flame stream. The core torch 4 is swingable along a groove 43 of the vessel 1 in such a manner that the inclination angle $\theta$ may be set at a desired value within an angular range of 10° to 60°. The set angle $\theta$ is read by a scale 44. The exhaust gas cleaner 10 is provided with a spray 45 for spraying water. The sprayed water converts the $Cl_2$ component contained in the exhaust gas into HCl. HCl is neutralized by NaOH. The water from the spray 45 washes away the glass fine particles and the like.

A step for jacketting the transparent preform 14 thus fabricated will be described referring to FIG. 3. As shown in FIG. 3, firstly the transparent glass preform 14 is stretched in conformity to the inner diameter of a silica tube 50. The stretched transparent preform 14' is inserted and sealed into the silica tube 50, so as to form a single-mode optical fiber preform 51. The single-mode optical fiber preform 51 is then drawn by a conventional fiber drawing machine to form a single-mode optical fiber.

Figure 4A:
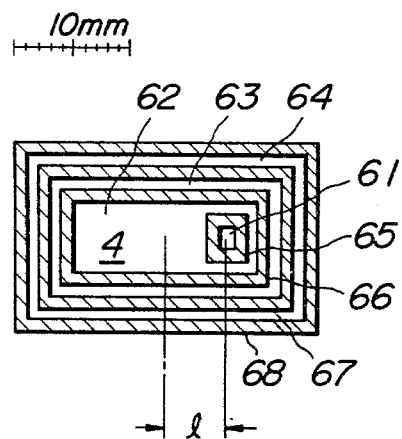
FIGS. 4A and 4B are cross sectional and longitudinal sectional views respectively for an embodiment of a core torch to be used in the present invention.
Figure 4B:
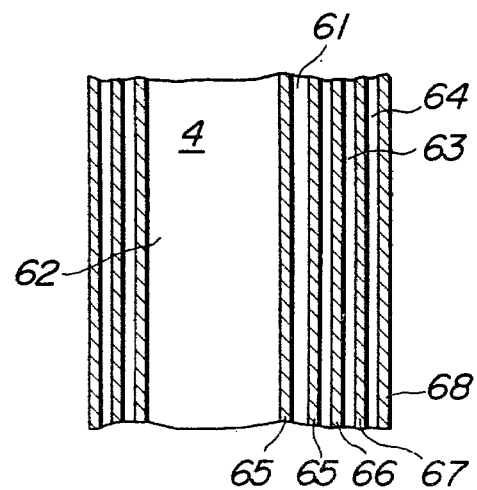

Various embodiments of a core torch according to the present invention will be described with reference to the drawings. FIG. 4A is a front view of an embodiment of a core torch according to the present invention. FIG. 4B shows a side view of this embodiment. In FIGS. 4A and 4B, reference numeral 61 denotes a glass raw material blowing nozzle, 62 an inert gas blowing nozzle, 63 a combustible gas blowing nozzle and 64 a subsidiary gas blowing nozzle. As shown in FIGS. 4A and 4B, the nozzles 61, 62, 63 and 64 have rectangular ring-shaped cross sections defined by multi-layered tubes 65, 66, 67 and 68 which also have rectangular cross sections, respectively. As seen from FIGS. 4A and 4B, the raw material gas blowing nozzle 61 is surrounded by the combustible gas blowing nozzle 63 with the inert gas blowing nozzle 62 intervening therebetween and is deviated by a distance l from the center of the inner area defined by the combustible gas blowing nozzle 63. The combustible gas blowing nozzle 63 is surrounded by the subsidiary combustible gas blowing nozzle 64. These rectangular tubes 65, 66, 67 and 68 may be made of silica glass. The geometrical dimensions of the torch 4 will be seen by using a scale (10 mm) shown in FIG. 4A. The exhaust tube 9 is disposed at a distance A from the periphery of the core porous glass body 11A, as illustrated in FIG. 5.

The core torch 4 having the blowing nozzles 61 to 64 is disposed inclined by an angle $\theta$ with respect to the axial direction 2A of the supporting rod 2, as shown in FIG. 5. The gases were blown out from the respective nozzles 61, 62, 63 and 64 under the following conditions to form the core porous glass body 11A. In the embodiment, $\theta = 45°$, $l = 5$ mm and $A = 15$ mm. In FIG. 5, reference numeral 69 designates a glass fine particle stream and 70 an oxy-hydrogen flame.

Raw material gas blowing nozzle 61: $SiCl_4$ (40° C. for saturation temperature, 70 cc/min for carrier Ar gas) $GeCl_4$ (15° C. for saturator temperature, 50 cc/min for carrier Ar gas)
Inert gas blowing nozzle 62: 1.5 l/min for Ar gas
Combustible gas blowing nozzle 63: 2.5 l/min for $H_2$ gas
Auxiliary gas blowing nozzle 64: 7 l/min for $O_2$
Under these conditions, the porous glass body 11A for the core having a diameter of 18 mm was grown on the end face of the supporting rod 2.

Figure 6A:
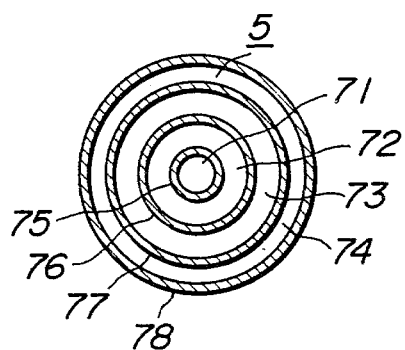
FIGS. 6A and 6B are cross sectional and longitudinal sectional views respectively of an embodiment of a cladding torch used in the present invention.
Figure 6B:
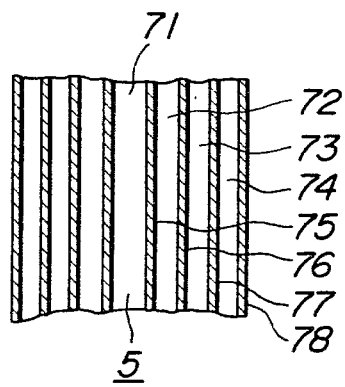

Around the porous glass body 11A for the core, the cladding layer 11B is deposited by the cladding torch 5, as shown in FIG. 2A. A co-axial multi-layer tube torch used in the conventional VAD method may be used for the cladding torch 5. FIG. 6A is a front view of a four-layered tube torch used as the cladding torch 5 in the present embodiment. FIG. 6B is a side view of the torch shown in FIG. 6A. In FIGS. 6A and 6B, reference numeral 71 denotes a raw material blowing nozzle, 72 an inert gas blowing nozzle, 73 a combustible gas blowing nozzle, and 74 an auxiliary gas blowing nozzle. Those blowing nozzles 71, 72, 73 and 74 are defined by four-layered tubes 75, 76, 77 and 78, which are made of silica glass, in the form of a co-axial circular ring when viewed in cross section. The cladding torch 5 thus constructed was disposed as shown in FIG. 2A and the cladding porous glass body (cladding layer) 11B was deposited around the core porous glass body 11A under the following conditions.

Raw material blowing nozzle 71: $SiCl_4$ (40° C. for saturator temperature, 250 cc/min for carrier Ar gas flow rate)
Inert gas blowing nozzle 72: 1.0 l/min for He gas
Combustible gas blowing nozzle 73: 3.5 l/min for $H_2$ gas
Auxiliary gas blowing nozzle 74: 4.5 l/min for $O_2$ gas
Under these conditions, the cladding porous preform 11B having a diameter of 60 mm was formed around the previously formed core porous glass body having a diameter of 18 mm. The growing speed of the preform 12 in the axial direction was about 40 mm/hour.

The porous preform 12 was heated by a ring-like vitrifying heater 13 provided at the upper portion. At the same time, He gas (10 l/min) and $Cl_2$ gas (0.5 l/min) were supplied from the dehydration gas supplier 15 to the heating section via the gas supply port 16. In this way, the porous preform 12 was vitrified at 1500° C. while the OH ions and $H_2O$ molecules were removed from the preform 12. The transparent preform 14 thus formed had an outer diameter (diameter of the cladding region) of 30 mm and a core region diameter of 9 mm. The refractive index difference Δn between the core and cladding regions was 0.0029.

When the distance A is selected within a range of 1 to 50 mm, the outer diameter fluctuation of the core porous glass body 11A is remarkably improved. In addition, there is no formation of a glass fine particle layer having a small apparent density which is formed when the conventional VAD method is used. Therefore, it does not occur that the core porous glass body 11A abnormally grows to have a large outer diameter. Further, "cracking" on the periphery of the porous glass body 11A is prevented to ensure the formation of a stable transparent glass body as a result of the consolidation.

In the arrangement of FIG. 5, the distance A was selected to be 15 mm. The exhausting amount of the undesired gases such as the residual glass fine particles, the reaction product gas, and the unreacted atmospheric gas exhausted from the exhaust port 9 was adjusted to be comparable with the blowing amounts of the glass fine particle stream 69 and the oxy-hydrogen flame 70. The outer diameter fluctuation of the porous glass body 11A fabricated under this condition was improved to be approximately ±0.05 mm. The residual glass fine particles did not form a glass fine particle layer having a small apparent density, so that stable fabrication of a transparent glass preform was ensured.

When the distance A was 50 mm or more, an amount of the undesirable gas exhausted through the exhaust port 9 was decreased and the residual glass fine particles were attached to the periphery of the core porous glass body 11A. As a result, the above-mentioned conventional problems were confirmed.

Further, when the distance A was 1 mm or less, mechanical fluctuation of the position caused by the rotation of the core porous glass body 11A brought the exhaust port 9 into contact with the periphery of the porous glass body 11A. As a result, the periphery of the porous glass body 11A was undulated, resulting in the transparent glass preform thus fabricated being hardly used as an optical fiber preform.

By arranging the exhaust port 9 as described above, a glass fine particle layer having a small apparent density was not formed on the peripheral surface of the porous glass body 11A for the core. Accordingly, the fine glass particle cladding layer may readily be attached to and deposited on the peripheral surface of the core glass body 11A by using the cladding torch 5. Further, in this case, if a second exhaust port was disposed, with a distance A'=1 to 50 mm, as described above, on the periphery of the cladding porous glass body 11B, the advantages as mentioned above was fully utilized to improve the production yield of single-mode optical fiber preforms by the VAD method. While the embodiments shown in FIGS. 2A and 2B had only one exhaust port 9, the above-mentioned advantages could be attained, if the distances A and A' between the core and cladding porous glass bodies 11A and 11B and the exhaust port 9 are selected to be within the range from 1 to 50 mm.

The transparent preform 14 thus obtained having an outer diameter of 30 mm was stretched by an oxy-hydrogen burner to form a glass preform 14' having an outer diameter of 6.7 mm, parameter 2B of equation (1) and a core diameter of 2 mm, parameter 2A of equation (1). The glass preform 14' was then sealed in a silica tube 50 having an outer diameter D1=26 mm and an inner diameter D2=7 mm. In this way, an optical fiber preform 51 was fabricated. The optical fiber preform 51 was then drawn into an optical fiber having an outer diameter of 125 μm. An inner diameter 2a of the fiber was approximately 9.6 μm when calculated by equation (1). The wavelength satisfying V=2.405, i.e., a cutoff wavelength λc, was nearly equal to 1.15 μm. This cutoff wavelength was accurately coincident with measured values of an actually manufactured optical fiber. By the above-mentioned method, two single mode optical fibers having a length of about 30 km were obtained from the transparent glass preform 14 having a length of 10 cm. The optical transmission loss of those optical fibers was small; 1 dB/km on the average at a wavelength of 1.55 μm. The OH absorption loss at a wavelength of 1.39 μm was about 20 dB/km.

The reason why, in the above-mentioned embodiment, the porous glass core body 11A having a narrow diameter of about 18 mm could be grown by the core torch 4 shown in FIGS. 4A and 4B, as described above, will follow. The torch 4 is inclined by an angle θ (45° in the present embodiment) with respect to the axial direction 2A, as shown in FIG. 5. The raw material gas blowing nozzle 61 is eccentrically located at a lower side portion of the torch 4 and the oxy-hydrogen flame stream 70 flows above the flow 69 from the nozzle 61. With this arrangement, the vertical and horizontal expansions of the glass fine particles 69 is restrained to limit the rising and attaching of the residual glass fine particles. As a result, the glass particles 69 are attached only to the end portion of the porous glass body 11A, as shown in FIG. 5.

Figure 7:
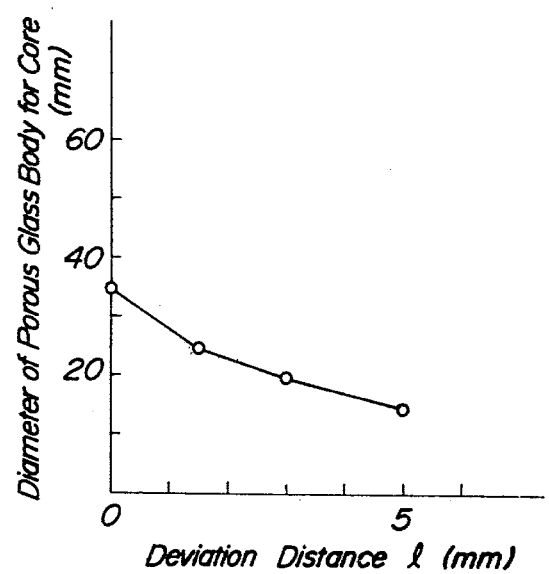
FIG. 7 is a graphical representation of the relationship of the diameter of the porous glass body for the core with the deviation distance l of the raw material gas blowing nozzle.

Many core torches 4 having different deviation distances 1 of the raw material gas blowing nozzle 61 shown in FIG. 5 were manufactured so that experiments could be conducted. The diameters (minimum) of the porous glass body 11A of the torches manufactured were measured. The minimum diameters measured in the case of those core torches 4 are shown in FIG. 7. The diameter of the core porous glass body 11A depends sensitively on the angle θ of the core torch 4 relative to the axis 2A of the porous glass body 11A shown in FIG. 5, or the supporting rod 2. The porous glass core body 11A exhibited a minimum diameter when the angle was within an range of 30° to 50°.

Figure 8:
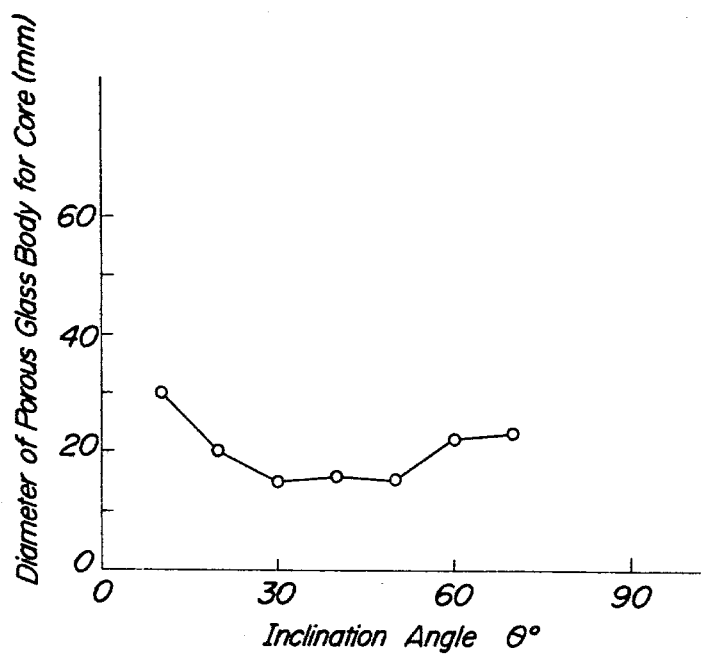
FIG. 8 is a graphical representation of the relationship of the diameter of the porous glass body for the core with the inclination angle of the core torch.

FIG. 8 depicts the experimental results obtained when the core torch 4 shown in FIGS. 4A and 4B is operated, in which the diameter of the core porous glass body is expressed as a function of the angle θ. Here, the deviation distance 1 was 5 mm in the experiment. As seen from FIG. 8, the diameter was minimum in a range of 30° to 50°, ranging from about 15 to 18 mm. Further, when the deviation distance 1 was varied within a range of 2 to 5 mm, a result similar to that of FIG. 8 was obtained.

As described above, when θ=10° to 60°, the outer diameter fluctuation of the porous glass preform is lessened, while at the same time the growing speed of it in the axial direction increases. For example, when $\theta = 30°$ to 40°, the outer diameter fluctuation was limited within ±0.5 to 1 mm and the growing speed was 70 to 100 mm/h. In this case, a large-sized preform corresponding to a single long-length optical fiber having a length of 50 to 100 km was obtained. The above is an example of the results obtained when the conventional synthesizing torch was used in the present invention. When a synthesizing torch according to the present invention was used under the condition that the distance A is 5 to 10 mm and the inclination angle $\theta$ is especially 30° to 40°, the fluctuation of the outer diameter of the core porous preform was improved to within ±0.5 mm.

Figure 9A:
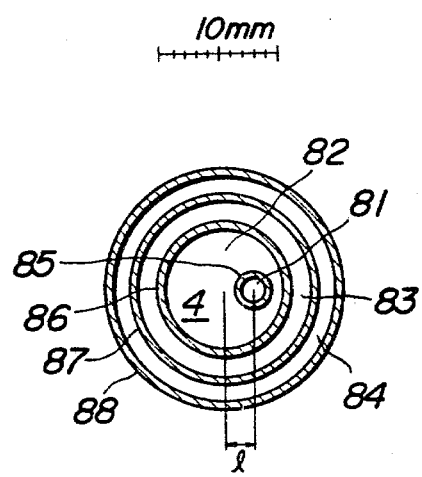
FIGS. 9A and 9B are cross sectional views of two other embodiments of a core torch according to the present invention.
Figure 9B:
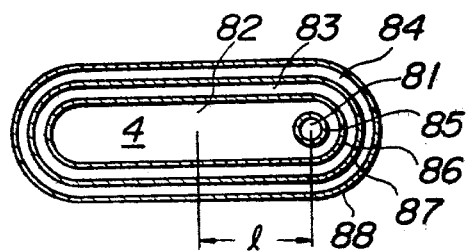

FIGS. 9A and 9B are cross sections of two other embodiments of a core torch 4 according to the present invention. In FIGS. 9A and 9B, reference numeral 81 designates a raw material gas blowing nozzle, 82 an inert gas blowing nozzle, 83 a combustible gas blowing nozzle and 84 an auxiliary gas blowing nozzle. As shown, the blowing nozzles 81, 82, 83 and 84 have respectively circular or elliptical ring cross sections defined by multi-layered tubes 85, 86, 87 and 88 having circular or elliptical cross sections. The raw material gas blowing nozzle 81 is surrounded by the combustible gas blowing nozzle 83 with the inert gas blowing nozzle 82 inserted therebetween. The combustible gas blowing nozzle 83 is surrounded by the auxiliary gas blowing nozzle 84. The raw material gas blowing nozzle 81 is located at a position deviated by the deviation distance l from the center of an inner area defined by the combustible gas blowing nozzle 83. In those embodiments, the raw material gas blowing nozzle 81 is deviated from the combustible gas blowing nozzle 83, so that those embodiments attains the effects similar to those obtained with the core torch in the previous embodiment.

Also in the present embodiment, the multilayered tubes 85, 86, 87 and 88 may be formed of silica glass. The respective geometrical dimensions of the core torch 4 will comparably be measured by using a scale (10 mm) indicated in FIG. 9A.

Figure 10A:
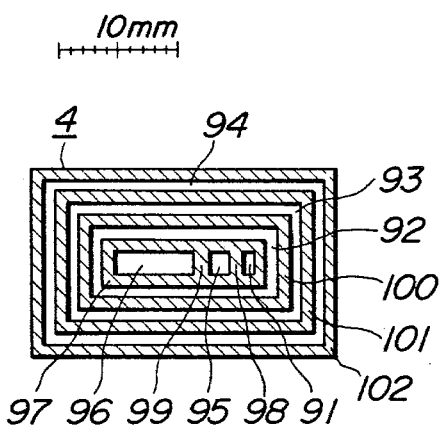
FIGS. 10A and 10B are cross sectional and longitudinal sectional views respectively of still other embodiments of a core torch used in the present invention.
Figure 10B:
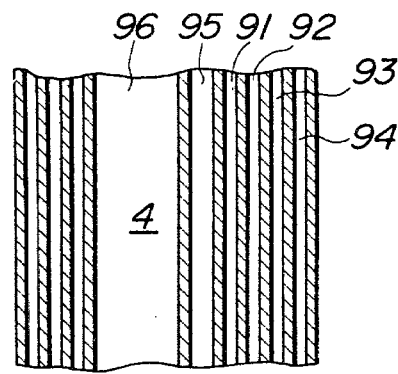

FIG. 10A shows a cross section of a further embodiment of a core torch according to the invention, and FIG. 10B shows a longitudinal sectional view of this torch. In FIGS. 10A and 10B, reference numeral 91 is a raw material blowing nozzle, 92 an inactive gas blowing nozzle, 93 a combustible gas blowing nozzle, 94 an auxiliary gas blowing nozzle, 95 a diameter adjusting gas blowing nozzle and 96 a subsidiary combustible gas blowing nozzle. The raw material gas blowing nozzle 91 is disposed apart from the center of the inner area defined by the combustible gas blowing nozzle 93. In addition, the diameter adjusting gas blowing nozzle 95 and the subsidiary combustible gas blowing nozzle 96 are disposed adjacent to the raw material blowing nozzle 91. The diameter adjusting gas nozzle 95 is for controlling the diameter of the porous glass body by the flow rate of adjusting gas to be blown out, for example, Ar gas.

The blowing nozzles 91, 95 and 96 are defined by partition walls 98 and 99 provided in a tube 97 having a rectangular cross section. The nozzles 92, 93 and 94 having rectangular cross sections are formed by surrounding in succession the rectangular tube 97 with multi-layered tubes 100, 101 and 102 having rectangular cross sections. Those tubes 97, 100, 101 and 102 and partition walls 98 and 99 may be made of silica glass. The respective geometrical dimensions of the respective portions of the core torch 4 will comparably be seen by referring to a scale (10 mm) indicated in FIG. 10A.

Figure 11:
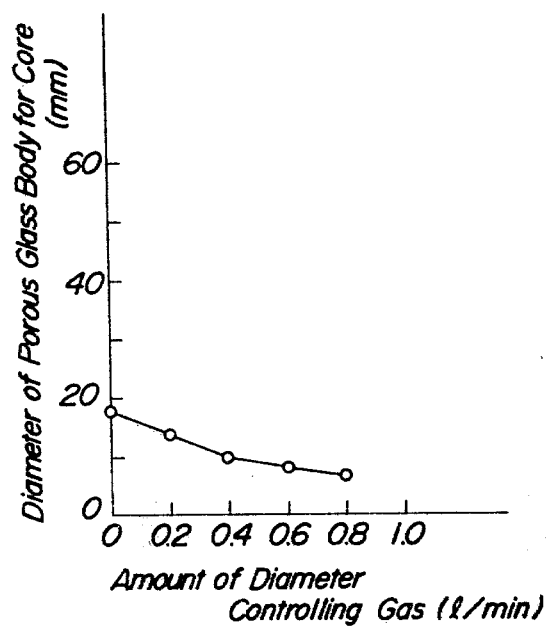
FIG. 11 is the graphical representation of a relationship of the diameter of the porous glass body for the core with the diameter controlling gas flow rate.

The relationship of the flow rate of the adjusting Ar gas blown out from the diameter adjusting blowing nozzle 95 with the porous glass core body 11A is illustrated in FIG. 11. FIG. 11 indicates that the diameter of the porous glass preform is varied by changing the flow rate of the adjusting gas. By taking advantage of this, a porous glass body 11A having a proper diameter is formed. If the porous glass cladding body 11B having a fixed outer diameter is formed around the core body 11A by the cladding torch 5, as shown in FIG. 2A, it is possible to obtain a porous glass body 12 having a desired cladding-to-core diameter ratio.

Taking account of the dimensions of the overall fabricating system and the synthesizing speed per unit time, the dimensions of the core torch 4 may be properly determined.

While the embodiment shown in FIG. 2A uses a single cladding torch 5 for deposition of the cladding porous glass body 11B, use of a plurality of torches for cladding is allowable for ease and stability of the deposition of the cladding porous glass body 11B.

Figure 12:
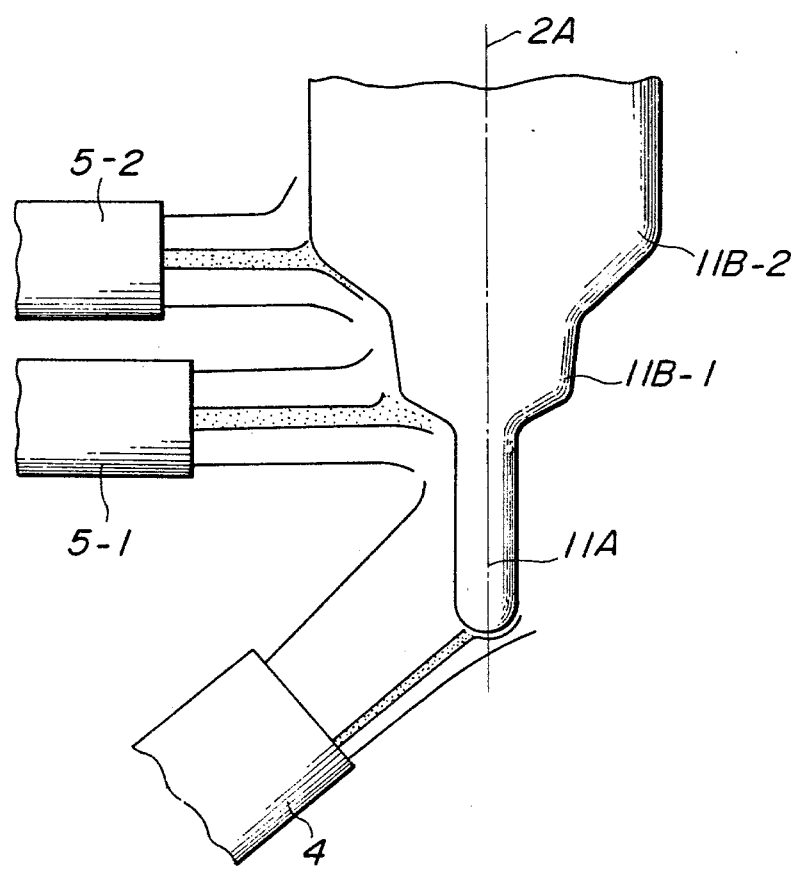
FIG. 12 is a schematic diagram illustrating the formation of the porous preform in the present invention.

FIG. 12 shows a porous glass preform fabricating section of the preform fabricating apparatus where two cladding torches 5-1 and 5-2 are used to embody the method of the present invention. In FIG. 12, as the core torch 4, use was made of a torch having the same structure as that shown in FIGS. 10A and 10B. The cladding torches 5-1 and 5-2 were the same as that shown in FIGS. 6A and 6B having the four-layer tube structure. These torches 5-1 and 5-2 are disposed apart from each other along the axial direction 2A of the supporting rod 2. In the glass body formation, the porous glass core body 11A is first formed by the torch 4, then a first cladding porous glass body 11B-1 is formed on the porous glass body 11A by the cladding torch 5-1, and a second cladding porous glass body 11B-2 is formed by the torch 5-2.

An example of the gas supply conditions to the torches 4, 5-1 and 5-2 will be given below.

Core Torch 4:
Raw material gas blowing nozzle 91; $SiCl_4$ (40° C. for saturator temperature, 70 cc/min for carrier Ar gas flow rate) $GeCl_4$ (20° C. for saturator temperature, 50 cc/min for carrier Ar gas flow rate)
Inert gas flowing nozzle 92: 1.5 l/min for Ar gas
Combustible gas flowing nozzle 93: 2 l/min for $H_2$ gas
Auxiliary gas blowing nozzle 94: 7 l/min for $O_2$ gas
Diameter adjusting gas blowing nozzle 95: 0.4 l/min for Ar gas
Subsidiary combustible gas blowing nozzle 96: 1 l/min for $H_2$ gas
Cladding Torch 5-1;
Raw material gas blowing nozzle 71: $SiCl_4$ (40° C. for saturator temperature, 100 cc/min for carrier Ar gas flow rate)
Inert gas blowing nozzle 72: 1 l/min for He gas
Combustible gas blowing nozzle 73: 3 l/min for $H_2$ gas
Auxiliary gas blowing nozzle 74: 4 l/min for $O_2$ gas
Cladding Torch 5-2:
Raw material gas blowing nozzle 71: $SiCl_4$ (40° C. for saturator temperature, 200 cc/min for carrier Ar gas flow rate)
Inert gas blowing nozzle 72: 1 l/min for He gas
Combustible gas blowing nozzle 73: 3.5 l/min for $H_2$ gas
Auxiliary gas blowing nozzle 74; 4 l/min for $O_2$ gas Under these conditions of flow rate, the porous glass body 11A for core having a diameter of 10 mm was formed at a growing speed of about 40 mm/h. A first cladding porous glass body 11B-1 having a diameter of about 30 mm was formed around the glass body 11A. A second cladding porous glass body 11B-2 having a diameter of about 60 mm was further formed around the first cladding porous glass body 11B-1. A transparent glass preform was fabricated after about 10 hours. The transparent glass preform had an outer diameter of 30 mm, a core diameter of 5 mm and an effective length of 15 cm. In this case, the refractive index difference between the core and cladding regions was 0.0044.

The dimension of the silica glass tube 50 was so selected that the core diameter in the optical fiber is 8 $\mu$m. Then, the transparent glass preform was subjected to the jacketting process shown in FIG. 3 and was finally drawn. The optical fiber thus obtained had a cutoff wavelength of 1.13 $\mu$m. Two single-mode optical fibers, each having a length of 25 km, was obtained from the transparent glass preform having a length of 15 cm. The optical transmission loss of this optical fiber was extremely low; about 0.5 dB/km at a wavelength of 1.55 $\mu$m. The OH absorption loss at a wavelength of 1.39 $\mu$m was extremely small; 2 dB/km or less.

As described above, in the present invention, the core torch in which the raw material gas blowing nozzle is deviated from the combustible gas blowing nozzle plays an important role in narrowing the porous glass core body and thus increasing the cladding-to-core diameter ratio. It is to be noted that even in the case of a torch of which the raw material gas blowing nozzle is not deviated geometrically, for example, the torch illustrated in cross section in FIG. 13, if the raw material gas blown out from the torch is geometrically deviated, the glass fine particles can substantially be prevented from expanding.

Figure 13:
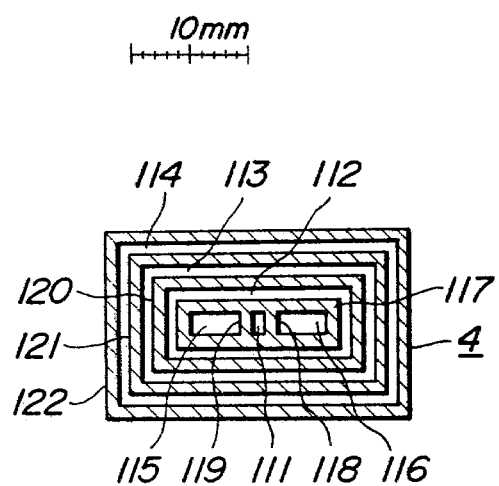
FIG. 13 is a cross sectional view showing another embodiment of a core torch used in the present invention.

In FIG. 13, reference numeral 111 denotes a raw material gas blowing nozzle, 112 an inert gas blowing nozzle, 113 a combustible gas blowing nozzle, 114 an auxiliary gas blowing nozzle, and 115 and 116 control gas blowing nozzles. The blowing nozzles 111, 115 and 116 are defined by partition walls 118 and 119 symmetrically disposed in a tube 117 which is rectangular in cross section. The blowing nozzles 112, 113 and 114 having rectangular cross sections are formed by surrounding the rectangular tube 117 by rectangular multitubes 120, 121 and 122. Silica glass may be used for those tubes 117, 120, 121 and 122 and the partition walls 118 and 119. The dimensions of the respective portions of the torch 4 will be seen by using the scale (10 mm) indicated in FIG. 13.

An example of the gas supply conditions to the core torch 4 shown in FIG. 13 will be given below.

Raw material gas blowing nozzle 111: SiCl$_4$ (40° C. for saturator temperature, 70 cc/min for carrier Ar gas flow rate) GeCl$_4$ (20° C. for saturator temperature, 50 cc/min for carrier Ar gas flow rate)
Inert gas blowing nozzle 112: Ar gas 1.5 l/min
Combustible gas blowing nozzle 113: H$_2$ gas 1 l/min
Auxiliary gas blowing nozzle 114: O$_2$ gas 7 l/min
Control gas blowing nozzle 115: H$_2$ gas 2 l/min
Control gas blowing nozzle 116: None Under these gas supply conditions, the porous glass body was grown in such an arrangement that the control gas blowing nozzle 115 is disposed at an upper location while the nozzle 116 is disposed at a lower location. A porous glass core body 11A having a relatively narrow diameter of about 25 mm was obtained. This is because the glass fine particles stream is deviated substantially below the oxy-hydrogen stream at the blowing end of the core torch 4 under the above-mentioned gas supply conditions. In this connection, when the flow rate of H$_2$ gas supplied to the control gas blowing nozzles 115 and 116 is equal, for example, 1 l/min, the diameter of the porous glass core body 11A was approximately 50 mm and accordingly failed to narrow the diameter of the glass body 11A. It is evident that the formation of the porous glass body by the core torch which blows out the raw material deviated relative to the oxyhydrogen flame stream falls within the scope of the present invention.

As is clear from the foregoing, the present invention has the following advantageous effects:

(1) A porous glass core body having a narrow diameter of less than 20 mm is fabricated readily. Accordingly, a glass preform for a single-mode optical fiber having a cladding-to-core diameter ratio equal to or larger than 3 may be manufactured by the VAD method. This allows the mass-production of long-length and low-loss single mode optical fibers.

(2) The fabrication method of the present invention is also applicable to fabricate preforms for multi-mode optical fibers. In this case, the thickness of the porous glass body for the cladding may be increase, so that there is no need for a subsidiary jacketting silica tube.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A method of fabricating a single-mode optical fiber preform from a seed rod having a longitudinal axis, comprising the steps of:

translating said seed rod along its longitudinal axis, said seed rod being rotated simultaneously with said translation;

producing a flame stream and a stream of fine glass particles located within said flame stream eccentric to the center area thereof, said flame and glass particle streams being directed against one end of said seed rod by a core torch inclined at an acute angle with respect to the longitudinal axis of said seed rod;

attaching and depositing said fine glass particles on said one end of said seed rod to form a porous glass core body, said porous glass core body being grown in the direction of said longitudinal axis of said seed rod by the action of said core torch;

exhausting non-reacted raw material for said porous glass core body through at least one exhaust port disposed in the vicinity of said core body;

producing glass particles for cladding said core body, said glass cladding particles being produced by a cladding torch;

attaching and depositing a porous glass cladding body on the periphery of said porous glass core body, said porous glass cladding body being grown in the direction of said longitudinal axis of said seed rod by the action of said cladding torch thereby forming a cladding layer;

heating the resulting porous glass body until it is vitrified into a transparent glass body; and sealing said transparent glass body within a silica tube.

2. A method of fabricating a single-mode optical fiber preform as claimed in claim 1 wherein said core torch is inclined at an angle by 30° to 50° with respect to the longitudinal axis of said seed rod.

3. A method of fabricating a single-mode optical fiber preform as claimed in claim 1 wherein said core torch is inclined at an angle of 30° to 40° with respect to the longitudinal axis of said seed rod.

4. A method of fabricating a single-mode optical fiber preform as claimed in claim 3, wherein said at least one exhaust port is disposed within a distance of 5 mm to 10 mm from the periphery of said porous core and cladding bodies and in the vicinity of growing surfaces of said porous core and cladding bodies, and wherein fine glass particles not attached to and deposited on said growing surfaces of said porous core and cladding bodies, gas produced as a result of hydrolysis by flame or thermal oxidation in said core and cladding torches and residual non-reacted glass raw material gas and flame forming gas are exhausted through said exhaust port.

5. A method of fabricating a single-mode optical fiber preform as claimed in claim 4, wherein said core torch has a glass raw material gas blowing nozzle and a combustible gas blowing nozzle, said combustible gas blowing nozzle surrounding said glass raw material gas blowing nozzle in such a manner that a glass raw material gas blown out from said glass raw material gas blowing nozzle is directed so as to be deviated from the center of an inner area defined by said combustible gas blowing nozzle, with respect to an oxy-hydrogen flame stream blown out from said combustible gas blowing nozzle.

6. A method of fabricating a single-mode optical fiber preform as claimed in claim 1 or 2 wherein said at least one exhaust port is disposed within a distance of 1 mm to 50 mm from the periphery of said porous core and cladding bodies and in the vicinity of the growing surfaces of said porous core and cladding bodies, and wherein fine glass particles not attached to and deposited on said growing surfaces of said porous core and cladding bodies, gas produced as a result of hydrolysis by flame or thermal oxidation in said core and cladding torches and residual non-reacted glass raw material gas and flame forming gas are exhausted through said exhaust port.

7. A method of fabricating a single-mode optical fiber preform as claimed in claim 1 or 2, wherein said core torch has a glass raw material gas blowing nozzle and a combustible gas blowing nozzle, said combustible gas blowing nozzle surrounding said glass raw material gas blowing nozzle in such a manner that a glass raw material gas blown out from said glass raw material gas blowing nozzle is directed so as to be deviated from the center of an inner area defined by said combustible gas blowing nozzle, with respect to an oxy-hydrogen flame stream blown out from said combustible gas blowing nozzle.

* * * * *